(12) United States Patent
Shirata

(10) Patent No.: US 8,558,447 B2
(45) Date of Patent: Oct. 15, 2013

(54) DISPERSION-TYPE ELECTROLUMINESCENCE DEVICE

(75) Inventor: Masashi Shirata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 197 days.

(21) Appl. No.: 13/262,075

(22) PCT Filed: Mar. 30, 2010

(86) PCT No.: PCT/JP2010/056136
§ 371 (c)(1),
(2), (4) Date: Sep. 29, 2011

(87) PCT Pub. No.: WO2010/114156
PCT Pub. Date: Oct. 7, 2010

(65) Prior Publication Data
US 2012/0019125 A1    Jan. 26, 2012

(30) Foreign Application Priority Data

Mar. 31, 2009  (JP) ................................ 2009-088522

(51) Int. Cl.
*H05B 33/14* (2006.01)

(52) U.S. Cl.
USPC .............. 313/502; 428/690; 252/301.4 S

(58) Field of Classification Search
USPC ..... 313/486, 502–506; 252/301.4 S, 301.4 F; 428/690
See application file for complete search history.

(56) References Cited

U.S. PATENT DOCUMENTS

| 8,080,174 B2 * | 12/2011 | Kawasaki et al. ........ 252/301.4 F |
| 8,282,859 B2 * | 10/2012 | Itoh et al. ................ 252/301.4 S |
| 2002/0113226 A1 | 8/2002 | Takehara et al. |
| 2005/0104509 A1 * | 5/2005 | Yamashita .................... 313/503 |
| 2007/0231592 A1 | 10/2007 | Agata |
| 2008/0303431 A1 | 12/2008 | Aiba et al. |
| 2009/0026926 A1 | 1/2009 | Shirata et al. |
| 2009/0284948 A1 | 11/2009 | Yamao et al. |

FOREIGN PATENT DOCUMENTS

| EP | 2 045 308 A1 | 4/2009 |
| JP | 3-64887 A | 3/1991 |
| JP | 5-89963 A | 4/1993 |
| JP | 7-90262 A | 4/1995 |
| JP | 7-166161 A | 6/1995 |
| JP | 2002-173676 A | 6/2002 |
| JP | 2002-235080 A | 8/2002 |
| JP | 2004-265866 A | 9/2004 |
| JP | 2006-41096 A | 2/2006 |
| JP | 2006-156358 A | 6/2006 |
| JP | 2007-12466 A | 1/2007 |
| JP | 2007-253589 A | 10/2007 |
| JP | 2007-290369 A | 11/2007 |
| JP | 2007-326981 A | 12/2007 |
| JP | 2009-18569 A | 1/2009 |
| WO | WO 2008/004640 A1 | 1/2008 |

OTHER PUBLICATIONS

Japanese Office Action for Japanese Application No. 2010-084411 dated Nov. 6, 2012, with partial English translation.
International Search Report, dated May 18, 2010, issued in PCT/JP2010/056136.
Written Opinion of the International Searching Authority, dated May 18, 2010, issued in PCT/JP2010/056136.

* cited by examiner

*Primary Examiner* — Anh Mai
*Assistant Examiner* — Brenitra M Lee
(74) *Attorney, Agent, or Firm* — Birch, Stewart, Kolasch & Birch, LLP

(57) ABSTRACT

A dispersion-type electroluminescence device is provided, the dispersion-type electroluminescence device including: a pair of electrodes including a transparent electrode and a back electrode; and at least a light emitting layer provided between the pair of electrodes, the light emitting layer containing phosphor particles, wherein the phosphor particles have D10 of more than 10 μm, D90 of less than 32 μm, and a D90/D10 value of less than 2.40, where D10 and D90 are particle diameters at 10% and 90% values in cumulative distribution of particle size distribution.

5 Claims, No Drawings

DISPERSION-TYPE ELECTROLUMINESCENCE DEVICE

TECHNICAL FIELD

This invention relates to a dispersion-type electroluminescence (EL) device having a light-emitting layer formed by dispersion-coating electroluminescence (EL) powder particles of high brightness and long lifetime.

BACKGROUND ART

An electroluminescence (EL) phosphors are voltage excitation type phosphors, and a dispersion-type EL device, in which the phosphor powder is sandwiched between electrodes to provide a luminescent element, and a thin film type EL device are known. The dispersion-type EL device generally has a structure sandwiching a dispersion of a phosphor powder in a high dielectric constant binder between two electrodes at least one of which is transparent. It emits light on applying an alternating electric field between the electrodes. The light emitting devices fabricated by using an EL phosphor powder could be made to have a thickness of several millimeters or smaller and have many advantages, such as emitting surface emission, reduced heat generation, and good luminescence efficiency. It is therefore expected to be applicable as road signs, interior and exterior lights, light sources of flat panel displays, such as LCDs, light sources for large area advertisements, and the like.

Nevertheless, light emitting devices fabricated using a phosphor powder have disadvantages of lower luminescence brightness, shorter emission lifetime, and uneven emission as compared with those predicated on other principles. Various improvements have hitherto been added to overcome these disadvantages. In particular, commercially available phosphor powders generally have a large average particle size in the range of from 20 to 30 μm. Smaller and monodispersed phosphor particles have therefore been demanded.

It is known that luminescence brightness may be increased by using small phosphor particles as proposed in patent JP-A-2002-235080 and JP-A-2004-265866. In the fabrication of an EL device, using small phosphor particles increases the number of phosphor particles per unit volume of the light emitting layer, thereby binging about improved brightness. In fact, however, luminescence brightness does not increase in proportion to the number of the phosphor particles. Moreover, an El device using small phosphor particles suffers from rapid deterioration in brightness.

JP-A-2007-326981 describes a method for obtaining uniform light emission by specifying the particle size distribution in terms of volume based cumulative distribution. Improved dispersibility is obtained by using phosphor particles the size of which is large but specified in terms of cumulative distribution, whereby the problem of uneven luminescence observed in applications to lighting equipment utilizing photoluminescence represented by a white LED is eliminated.

SUMMARY OF INVENTION

However, dispersibility as obtained merely by specifying in terms of cumulative distribution values is not sufficient in the production of light emitting devices demanding uniformity of an electric field, such as electroluminescence devices, still leaving the problems of electric field non-uniformity and insufficient durability.

An object of the invention is to provide a dispersion-type EL device having high brightness and extended lifetime.

As a result of intensive investigations, the present inventor has found that a dispersion-type EL device having high luminescence brightness and extended lifetime is provided by using phosphor particles having a 10% diameter (D10) of more than 10 μm, a 90% diameter (D90) of less than 32 μM, and a D90/D10 value of less than 2.40 in a cumulative distribution of particle size distribution. The invention has been completed based on this finding.

That is, the problem is solved by the following means.

(1) A dispersion-type electroluminescence device, including:
a pair of electrodes including a transparent electrode and a back electrode; and
at least a light emitting layer provided between the pair of electrodes, the light emitting layer containing phosphor particles,
wherein the phosphor particles have D10 of more than 10 μm, D90 of less than 32 μm, and a D90/D10 value of less than 2.40, where D10 and D90 are particle diameters at 10% and 90% values in cumulative distribution of particle size distribution.

(2) The dispersion-type electroluminescence device as described in (1),
wherein the phosphor particles contain zinc sulfide as a host material; and copper as an activator contained in a concentration of 0.10 to 0.16 mol % with respect to zinc.

(3) The dispersion-type electroluminescence device as described in (1) or (2), further including:
a red conversion material.

(4) The dispersion-type electroluminescence device as described in (1) or (2),
wherein the light emitting layer contains red light-emitting phosphor particles besides the phosphor particles.

(5) The dispersion-type electroluminescence device as described in (1), which is sealed by a gas barrier laminate film,
wherein the gas barrier laminate film includes at least one inorganic layer and at least one organic layer on or above a base film, the organic layer containing a polymerization product of a monomer composition, the monomer composition containing at least one acrylate having a phosphoester group.

As used herein, the term "phosphor particles" means particles that emit light on voltage application.

DESCRIPTION OF EMBODIMENTS

The invention will be described in detail below.
Phosphor Particles

The phosphor particles that can be used in the invention have a 10% diameter (D10) of more than 10 μm, a 90% diameter (D90) of less than 32 μm, and a D90/D10 value of less than 2.40 in a volume based cumulative distribution. The D10 is preferably 11 to 16 μm, more preferably 12 to 15 μm. The D90 is preferably 25 to 31 μm, more preferably 26 to 30 μm. The theoretically smallest possible minimum D90/D10 value is 1, which could be reached when all the particles have quite the same size, which case is very rare in practice. As the upper limit of D90/D10 value, D90/D10 is preferably less than 2.35, more preferably less than 2.30. Particles having a D10 of 10 μm or less fail to exhibit increased luminescence brightness because of a large proportion of small particles having low brightness. Particles having a D90 of 32 μm or more also fail to achieve increased brightness due to a failure of the dispersion to form a uniformly thin light emitting layer. D90/D10 values of 2.4 or greater mean that the particles have broad size distribution. Such particles encounter difficulty in forming a light emitting layer with a smooth surface and are likely to cause emission unevenness and life reduction.

Phosphor particles having the recited specific size distribution are obtained by appropriately controlling the conditions of particle synthesis or by classifying particles as synthesized. Methods for determining the particle size and particle size distribution include, in addition to laser diffraction method (scattering method), X-ray extinction method, light extinction method, electric detection zone method, and centrifugal sedimentation light extinction method. The laser diffraction method (scattering method) is preferred for easy operation and high repeatability. For example, a laser diffraction/scattering particle size analyzer LA-920 from Horiba, Ltd. may be used. Since the size of a particle partly adhering to another particle is not accurately measured, it is preferred that the particles to be measured be previously dispersed in a liquid medium. It is preferred to completely disperse the particles by using a suitable dispersant and applying, for example, ultrasonic waves before the measurement.

The phosphor particles that are preferably used in the invention are particles of semiconductors composed of one or more elements selected from the group consisting of Group II elements and Group VI elements and semiconductors composed of one or more elements selected from the group consisting of Group III elements and Group V elements according to any desired emission wavelength region. Exemplary are CdS, CdSe, CdTe, ZnS, ZnSe, ZnTe, CaS, SrS, GaP, and GaAs, with ZnS being more preferred.

The EL phosphor particles for use in the invention can be prepared by baking method (solid phase process) widely employed in the art. In a case of Zinc sulfide, for instance, a fine particle powder of 10 to 50 nm (generally called crude powder) is prepared in a liquid phase and used as a primary particle, that is, a host material. Zinc sulfide takes on a high temperature stable hexagonal phase and a low temperature stable cubic phase, either of which or a mixture of which is useful. An impurity called an activator or a co-activator and a flux are mixed into the host material, and the mixture is baked in a crucible at a high temperature of from 900° to 1300° C. for 30 minutes to 10 hours (first baking) to obtain a phosphor precursor powder. To obtain phosphor particles having a suitable average particle size and a low coefficient of size variation, the first baking is preferably performed at 950° to 1250° C., more preferably 1000° to 1200° C., for 0.5 to 6 hours, more preferably 1 to 4 hours. The amount of the flux to be added is preferably 20% or more, more preferably 30% or more, even more preferably 40% or more, by mass. The proportion of the flux here is shown as follows: The proportion of the flux (% by mass)=the mass of the flux/(the mass of the raw material phosphor primary particles+the mass of the flux). In the case where an activator is previously incorporated into the crude powder as with the hereinafter described case of making copper-activated zinc sulfide phosphor particles, the copper as an activator and the raw powder of phosphor are regarded as integral with each other so that the mass of the copper is included in the mass of the phosphor raw material.

A flux may have its mass varied between room temperature and a baking temperature. For example, barium chloride exists in the form of $BaCl_2.2H_2O$ at room temperature but loses the water of hydration to become $BaCl_2$ at a baking temperature. The term "amount of the flux" as referred to herein indicates the mass of the flux in a stable condition at room temperature.

The activator is preferably copper. Examples of the source supplying copper include, but are not limited to, copper sulfate, copper sulfide, copper chloride, and copper bromide. A preferred copper concentration is 0.10 to 0.16 mol %. At a copper concentration exceeding 0.16 mol %, the excess copper can precipitate on the surface of particles to cause coloration of the particles. Copper concentrations of at least 0.10 mol % will provide a sufficient amount of luminescent centers. The copper concentration is preferably 0.11 to 0.15 mol %, more preferably 0.120 to 0.140 mol %.

The copper content is adjusted by controlling the amount of a copper source to be mixed with the crude powder.

The copper content of the phosphor particles is determined by dissolving the particles in hydrochloric acid, nitric acid, or, as the case may be, aqua regalis and analyzing the solution by inductive coupled plasma (ICP) emission spectroscopy.

The precursor powder obtained by the first baking is preferably washed with ion exchanged water to remove the excess of the activator, co-activator, and flux.

The precursor powder as obtained by the first baking has a spontaneously generated planar stacking fault (twin structure). The stacking fault density may be increased greatly without destroying the particles by adding an impact force in a certain range. An impact force may be applied by, for example, bringing the precursor powder particles into direct contact with each other, blending the precursor powder with spherical beads of, e.g., alumina (ball milling), or colliding accelerated precursor powder particles against each other. In the case of zinc sulfide, in particular, there are two crystal systems, cubic and hexagonal. The former crystal structure is represented by three layers of the closest packed planes ((111) plane) ABCABC, while the latter crystal structure is arranged by repeating every other closest packed plane, represented as ABAB perpendicular to the c-axis. On applying an impact to zinc sulfide crystals in, e.g., a ball mill, the closest packed planes of a cubic crystal slip over each other (edge dislocation), resulting in partial occurrence of a hexagonal structure (ABAB) with the layer C missing. It cal also occur that the layers A and B are replaced with each other to cause crystal twinning. Because impurity in a crystal is generally concentrated at the lattice defects, when zinc sulfide having stacking faults is heated to allow an activator, such as copper sulfide, to diffuse, the activator precipitates at the stacking faults. The interface between the precipitated activator and the host material, zinc sulfide, works as the luminescent center. For this reason, to increase the stacking fault density is effective in improving brightness.

The precursor powder is then subjected to second baking. The second baking is conducted at a temperature lower than in the first baking in the range of from 500° to 800° C. for a shorter time of from 30 minutes to 3 hours to achieve annealing. The activator is thus caused to precipitate concentrically at the stacking faults.

Then, the phosphor precursor particles are subjected to etching treatment with an acid (e.g., hydrochloric acid) to be cleared of any metal oxide on their surface and washed with, e.g., a KCN solution to remove copper sulfide from their surface, followed by drying to obtain EL phosphor particles.

Other methods that can be adapted to prepare the phosphor particles include vapor phase methods, such as laser ablation, CVD, plasma assisted method, sputtering, and a combination of resistance heating or electron beam irradiation and vacuum deposition on fluidized oil film; liquid phase methods, such as double decomposition, precursor pyrolysis, reversed micellation, a combination of any of these liquid phase methods with high temperature baking, and freeze drying; urea melt method; and spray pyrolysis.

It is preferred that the phosphor particles for use in the invention be zinc sulfide containing copper as an activator and contain at least one metal element belonging to the second transition series of Groups 6 through 10, particularly at least one of molybdenum, platinum, and iridium. These metal elements are preferably present in zinc sulfide in a concentration of $1 \times 10^{-7}$ to $1 \times 10^{-3}$ mol, more preferably $1 \times 10^{-6}$ to $5 \times 10^{-4}$ mol, per mole of zinc sulfide. The metal element is preferably incorporated into the zinc sulfide particles by thoroughly slurring in deionized water together with zinc sulfide powder and a predetermined amount of copper sulfate, drying the slurry, and baking the dry powder with a co-activator and a flux. The metal may also be preferably incorporated into the zinc sulfide particles by blending a powder of a complex containing the metal with a flux or a co-activator and baking zinc sulfide powder together with the blend. In either case, while any compound containing the metal element to be incorporated may be used as a source of the metal, it is preferred to use a metal complex having oxygen or nitrogen coordinated to a metal or a metal ion. The ligand of the complex may be either an organic compound or an inorganic compound. By the incorporation of the metal element, further improvements in brightness and lifetime are obtained.

The phosphor particles may have a non-luminous shell on their surface as taught in JP 2005-283911A, paras. [0028] through [0033].

Light Emitting Layer

The light emitting layer is formed by dispersing the above-described phosphor particles in an organic liquid medium and applying the resulting dispersion to a substrate. Examples of the liquid medium include organic polymers and high boiling organic solvents. Organic binders composed mainly of organic polymers are preferred. The organic binder is preferably one having a high dielectric constant. Specifically, at least part of the organic binder is preferably chosen from fluoropolymers (e.g., those having a fluoroethylene unit or a chlorotrifluoroethylene unit), polysaccharides having cyanoethylated hydroxyl groups (e.g., cyanoethyl pullulan and cyanoethyl cellulose), polyvinyl alcohols (e.g., cyanoethylated polyvinyl alcohol), phenol resins, polyethylene, polypropylene, polystyrene resins, silicone resins, epoxy resins, polyvinylidene fluoride, and so forth. The dielectric constant of the binder may be adjusted by appropriately mixing fine particles of high dielectric constant substances, such as $BaTiO_3$ and $SrTiO_3$, into the binder.

The phosphor particles are dispersed in the binder by means of a homogenizer, a planetary mixer, a roll mixer, an ultrasonic disperser, and so on.

The amount of the binder to be used is preferably such as to give a phosphor content of 30% to 90%, more preferably 60% to 85%, by mass based on the total solids content of the light emitting layer. With the recited phosphor content, a smooth surface of the light emitting layer is assured. The term "phosphor content" as used above refers to the total content of all the phosphor particles used.

A particularly preferred binder system is one containing at least 20%, more preferably 50% or more, by mass of a polymer having cyanoethylated hydroxyl groups relative to the total mass of organic liquid media used in the light emitting layer.

The thickness of the light emitting layer is preferably at least 20 μm and less than 80 μm, more preferably at least 25 μm and less than 75 μm. With a light emitting layer thickness of 20 μm or more, a light emitting layer with a smooth surface is formed. With a thickness less than 80 μm, an electric field is effectively applied to the phosphor particles. In the case where a blocking layer is provided as hereinafter described, it is recommended to reduce the thickness of an insulating layer hereinafter described and increase the thickness of the light emitting layer thereby to compensate for the reduction in initial brightness while securing sufficient durability. To further secure good initial brightness, the thickness of the light emitting layer is preferably not more than 70 μm.

Blocking Layer

The EL device of the invention may have a blocking layer between the transparent electrode and the light emitting layer. For the details of the blocking layer, reference is made to, e.g., JP 2007-12466A, paras. [0013] through [0020].

Insulating Layer

The EL device of the invention preferably has an insulating layer between the light emitting layer and the back electrode. The insulating layer may be of any material having a high dielectric constant, high insulating properties, and a high dielectric breakdown. Examples of such a dielectric material include metal oxides and metal nitrides, such as $BaTiO_3$, $KNbO_3$, $LiNbO_3$, $LiTaO_3$, $Ta_2O_3$, $BaTa_2O_6$, $Y_2O_3$, $Al_2O_3$, and AlON. The insulating layer may be formed as a homogeneous layer or a particulate layer containing an organic binder. For example, a film formed of $BaTiO_3$ particles and $BaTiO_3$ sol may be used as described in *Mat. Res. Bull.*, vol. 36, p. 1065.

The thickness of the insulating layer is preferably 10 μm or more and less than 35 μm, more preferably 12 μm or more and less than 33 μm, even more preferably 15 μm or more and less than 31 μm. Too thin an insulating layer easily undergoes dielectric breakdown. Too thick an insulating layer lessens the voltage applied to the light emitting layer, resulting in substantial reduction in luminescence efficiency.

Examples of the organic binder for use in the insulating layer include polymers with a relatively high dielectric constant, such as cyanoethyl pullulan, cyanoethylated polyvinyl alcohol, and cyanoethyl cellulose resins, and other resins, such as polyethylene, polypropylene, polystyrene resins, silicone resins, epoxy resins, and polyvinylidene fluoride. The dielectric constant may be adjusted by appropriately mixing fine particles of high dielectric constant substances, such as $BaTiO_3$ and $SrTiO_3$, into the resins. The insulating particles can be dispersed by means of a homogenizer, a planetary mixer, a roll mixer, an ultrasonic disperser, and so on.

Red Material

In order to fabricate a white emitting EL device of the invention using, for example, a blue-green emitting phosphor, a red light-emitting material is used in combination. The red light-emitting material to be used may be an organic material that absorbs the light emitted from the blue-green emitting phosphor particles and converts the blue-green light to red (hereinafter also referred to as a red conversion material) or an inorganic material showing red electroluminescence. Suitable examples of the former are organic fluorescent dyes or pigments. They may be dispersed in the light emitting layer or the insulating layer. They may be present between the light emitting layer and the transparent electrode or on the opposite side of the light-emitting layer to the transparent electrode. The latter material may be incorporated into the light emitting layer together with the blue-green emitting phosphor particles or disposed between the transparent electrode and the insulating layer as a red inorganic phosphor material layer independent of the blue-green light emitting layer.

Similarly to the blue-green emitting phosphor, the host material of the red light-emitting phosphor that can be preferably used in the invention is composed of one or more elements selected from the group consisting of Group II elements and Group VI elements or composed of one or more elements selected from the group consisting of Group III elements and Group V elements according to any desired emission wavelength region. The activator is selected from, but not limited to, transition metals, such as Cu and Mn. The co-activator is selected from, for example, Group VII elements, such as F, Cl, Br, and I, and Group III elements, such as Al, Ga, and In. It is preferred that the host material be also doped with a rare earth element, such as Ce, Eu, or Sm. Suitable examples of the red light-emitting phosphor include ZnS:Cu,In and CaS:Eu,Ce.

The red conversion material will be described in more detail. White light emitted from the EL device of the invention preferably contains a red component having a wavelength of 590 to 650 nm. To obtain a red emission wavelength within that range, a red conversion material may be incorporated into the light emitting layer or be disposed between the light emitting layer and the transparent electrode or on the opposite side of the light-emitting layer to the transparent electrode but is most preferably incorporated into the insulating layer. It is preferred that all the insulating layers of the EL device contain the color conversion material. It is more preferred that the EL device has two or more divided insulating layers, one or more of which contains the color conversion material. The layer containing the color conversion material is preferably located between a red conversion material-free insulating layer and the light emitting layer. It is also preferred that the layer containing the red conversion material be sandwiched between red conversion material-free insulating layers.

In the case where the layer containing the red conversion material is located between a red conversion material-free insulating layer and the light emitting layer, the thickness of the red conversion material-containing layer is preferably 1 to 20 μm, more preferably 3 to 17 μm. The concentration of the red conversion material in the insulating layer is preferably 1% to 20% by mass, more preferably 3% to 15% by mass, based on the dielectric material typified by $BaTiO_3$. In the case where the red conversion material-containing layer is sandwiched between red conversion material-free insulating layers, the thickness of the red conversion material is preferably 1 to 20 μm, more preferably 3 to 10 μm. The concentration of the red conversion material in the insulating layer is preferably 1% to 30% by mass, more preferably 3% to 20% by mass, based on the dielectric material. In the case where the red conversion material-containing layer is sandwiched between red conversion material-free insulating layers, it is also a preferred embodiment that the red conversion material-containing layer be free of a dielectric material and composed solely of a high dielectric constant binder and the red conversion material.

The red conversion material preferably has a luminescence wavelength of 590 to 750 nm, more preferably 600 to 650 nm, even more preferably 605 to 630 nm, in its powder form. When the red conversion material is added to an EL device and the EL device emits electroluminescence, the red luminescence wavelength is preferably, as stated above, 590 to 650 nm, more preferably 595 to 630 nm, even more preferably 600 to 620 nm.

The binder for use in the red conversion material-containing layer is preferably selected from polymers with a relatively high dielectric constant, such as cyanoethyl pullulan, cyanoethylated polyvinyl alcohol, and cyanoethyl cellulose resins, and other resins, such as polyethylene, polypropylene, polystyrene resins, silicone resins, epoxy resins, and polyvinylidene fluoride.

Examples of preferred red conversion materials include fluorescent dyes and fluorescent pigments as stated above. Examples of preferred compounds constituting the luminescent center of the fluorescent pigments or dyes include compounds having rhodamine, lactone, xanthene, quinoline, benzothiazole, triethylindoline, perylene, triphennine, or dicyanomethylene as a skeleton. Cyanine dyes, azo dyes, polyphenylene vinylene polymers, disilane oligothienylene polymers, ruthenium complexes, europium complexes, and erbium complexes are also preferred. These compounds may be used either individually or as a mixture of two or more thereof. The red conversion material may be used as dispersed in, e.g., a polymer. The fluorescent pigment having a luminescence peak wavelength in the range recited above is exemplified by SEL 1003 available from Shinloihi Co., Ltd.

The luminescence peak wavelength of the fluorescent pigment or dye used may be adjusted to within the range by using a filter, such as a band reflection filter.

Transparent Electrode

The transparent electrode for use in the invention is obtained by evenly applying a transparent, electrically conductive material, such as indium tin oxide (ITO), tin oxide, antimony-doped tin oxide, zinc-doped tin oxide, or zinc oxide, to a transparent substrate, such as a glass substrate or a transparent film of polyethylene terephthalate or triacetyl cellulose, to form a thin film by vapor deposition, coating, printing, or any other means. In what follows, the term "conductive" or "conductivity" means "electrically conductive" or "electrical conductivity" unless otherwise specified. The transparent electrode may be a multilayer structure having a thin film of silver sandwiched in between high refractive index layers. Conductive polymers including conjugate polymers, such as polyaniline and polypyrrole, are also used to provide a transparent electrode. The details of the transparent conductive materials, reference can be made to DENJIHA SHIELD ZAIRYO NO GENJYO TO SYORAI, Toray Research Center, Inc. and JP 9-147639A.

A transparent conductive sheet having improved conductivity is also preferred, which is obtained by preparing a transparent conductive sheet or conductive polymer formed of the above described transparent conductive material on the above described transparent film and disposing thereon a wire structure formed by evenly arranging fine strands of metal and/or alloy wire in a network, comb, grid, or a like pattern.

The fine wire, when used in combination, is preferably of copper, silver, nickel, aluminum, or an alloy thereof. Depending on the purpose, wire of the transparent conductive material recited above may be used in place of the metal or alloy wire. It is preferred to use wire materials having high electrical and thermal conductivity. The width of the wire strand is preferably, but not limited to, about 0.1 μm to 1000 μm. The pitch of the wire strands, i.e., the distance between adjacent wire strands, is preferably 50 μm to 5 cm, more preferably 100 μm to 1 cm. The height (or thickness) of the wire structure is preferably 0.1 to 10 μm, more preferably 0.5 to 5 μm. The wire structure may be exposed on the surface of the transparent conductive material or covered with the transparent conductive material. In either case, the conductive surface of the transparent conductive electrode preferably has a surface roughness of 5 μm or less. In terms of good adhesion, the surface roughness is more preferably 0.01 to 5 μm, even more preferably 0.05 to 3 μm.

As used herein, the term "surface roughness" of the conductive surface denotes an average amplitude of surface roughness over a measuring area of 5 mm square as measured with a three dimensional surface roughness meter, e.g., Surfcom 575A-3DF from Tokyo Seimitsu Co., Ltd. Surface roughness below the resolution of a surface roughness meter is determined by the measurement using a scanning tunneling microscope or an electron microscope.

The relation between width, height (or thickness), and pitch of the wire strands is decided according to the purpose.

Typically, the strand width is preferably 1/10000 to 1/10 the pitch, and the strand height is preferably 1/100 to 10 times the width.

The transparent electrode preferably has a surface resistivity of 0.1 to 100 Ω/sq, more preferably 1 to 80 Ω/sq, as measured in accordance with the method specified in JIS K6911.

When in using the fine wire structure of metal and/or alloy, it is desirable to minimize reduction in light transmission. It is desirable to secure a light transmission of at least 90% by limiting the pitch, width, and height of the wire strands within the ranges described. It is preferred for the transparent electrode for use in the invention to have a transmission of at least 70%, more preferably 80% or more, even more preferably 90% or more, at a wavelength of 550 nm.

In order to improve the brightness and to provide white light emission, it is preferred for the transparent electrode to have a transmission of at least 80%, more preferably 90% or more, for light of 420 to 650 nm. In order to obtain white light emission, it is more preferred for the transparent electrode to have a transmission of 80% or more for light of 380 to 680 nm. Light transmissions of the transparent electrode are determined using a spectrophotometer.

Back Electrode

The back electrode through which emitted light is not extracted may be of any conductive material selected from among, for example, metals, such as gold, silver, platinum, copper, iron, and aluminum, and graphite as appropriate to the configuration of the EL element, the temperature in the fabrication steps, and the like. A transparent electrode made of, e.g., ITO may be used as long as conductivity is secured. It is important for the back electrode to have high thermal conductivity, specifically at least 2.0 W/(cm·deg), preferably 2.5 W/(cm·deg) or more, so as to provide improved durability. It is also preferred to use a metal sheet or a metal mesh as a back electrode to secure both high conductivity and efficient heat dissipation around the EL device.

Fabricating Method

The method for fabricating the EL device of the invention is not limited. For example, the method described in detail in JP 2007-12466A, paras. [0046] through [0049] may be adapted as appropriate.

Sealing

In the final step of the EL device fabrication, it is preferred to seal the device by sealing film to protect against the influences of humidity and oxygen of the outside environment. For the details of sealing techniques, reference may be made to JP 2007-12466A, paras, [0050] to [0055].

A gas barrier laminate film is a preferred sealing film. The description hereinafter given about the elements of the present invention may sometimes be based on a representative embodiment of the invention, in which case, it should be understood that the invention is not limited to that particular embodiment.

Gas Barrier Laminate Film

Laminate Structure

The gas barrier laminate film that is preferably used as sealing film preferably includes a base film, at least one inorganic layer, and at least one organic layer. The number and the sequence of forming the inorganic layer and the organic layer on the base film are not limited. The inorganic layer and the organic layer may be provided on the base film in that order or in the reverse order. A laminate film having the organic and inorganic layers alternating on the base film, for example, a laminate film having an inorganic layer, an organic layer, and an inorganic layer on the base film in that order is preferred. The number of the inorganic layers and that of the organic layers to be laminated are each preferably 1 to 10, more preferably 1 to 5, even more preferably 1 to 3. The base film may be laminated with these layers on one or both sides thereof.

A functional layer may be provided between the base film and the inorganic layer, between the base film and the organic layer, or between the inorganic layer and the organic layer. Examples of the functional layer include optically functional layers, such as an antireflective layer, a polarizing layer, a color filter, and a light extraction efficiency enhancing layer; mechanically functional layers, such as a hardcoat layer and a stress relaxing layer; electrically functional layers, such as an antistatic layer and a conductive layer; an antifogging layer, an antifouling layer, and a printable layer.

Organic Layer

The organic layer making up the gas barrier laminate film may be a film containing a polymer having a phosphoester group. A polymer having a phosphoester group is obtainable by polymerizing a monomer composition containing a polymerizable monomer having at least one phosphoester group.

A laminate film having an inorganic layer and an organic layer containing a polymer having a phosphoester group on one side of the base film may have, on the opposite side of the based film, a gas barrier laminate composed of an inorganic layer, an organic layer, and an inorganic layer in that order. A laminate film having such a gas barrier laminate is capable of preventing invasion of water molecules from the opposite side, thereby to control dimensional change of the gas barrier laminate film and to prevent stress concentration in the inorganic layer or break of the inorganic layer, which leads to further improved durability.

The monomer having a phosphoester group is preferably represented by the following formula (1).

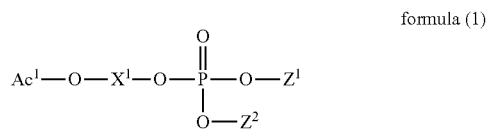

formula (1)

In the formula (1), $Z^1$ represents $Ac^2$—O—$X^2$—, a substituent having no polymerizable group or a hydrogen atom; $Z^2$ represents $Ac^3$—O—$X^3$—, a substituent having no polymerizable group or a hydrogen atom; $Ac^1$, $Ac^2$, and $Ac^3$ each independently represents an acryloyl group or a methacryloyl group; and $X^1$, $X^2$, and $X^3$ each independently represents an alkylene group, an alkyleneoxy group, an alkyleneoxycarbonyl group, an alkylenecarbonyloxy group, or a combination thereof.

The monomer represented by formula (1) may be a monofunctional monomer represented by formula (2) below, a bifunctional monomer represented by formula (3) below, or a trifunctional monomer represented by formula (4) below.

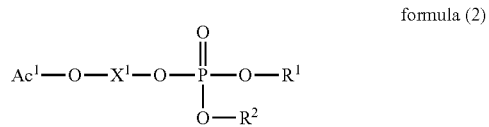

formula (2)

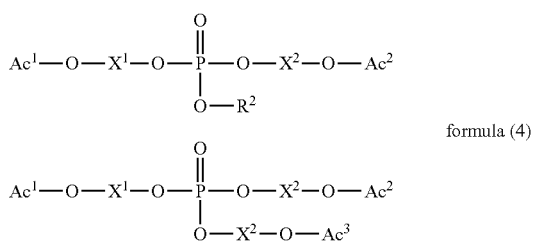

Definitions of $Ac^1$, $Ac^2$, $Ac^3$, $X^1$, $X^2$, and $X^3$ are the same as the definitions in formula (1). In the formulae (2) and (3), $R^1$ and $R^2$ each independently represent a substituent having no polymerizable group or a hydrogen atom.

In formulae (1) to (4), each of $X^1$, $X^2$, and $X^3$ preferably contains 1 to 12 carbon atoms, more preferably 1 to 6 carbon atoms, even more preferably 1 to 4 carbon atoms. Examples of the alkylene group or the alkylene moiety of the alkyleneoxy, alkyleneoxycarbonyl, or alkylenecarbonyloxy group as represented by $X^1$, $X^2$, and $X^3$ include methylene, ethylene, propylene, butylene, pentylene, and hexylene. The alkylene group or moiety may be straight chain or branched but is preferably straight chain. Each of $X^1$, $X^2$, and $X^3$ is preferably an alkylene group.

Examples of the substituent having no polymerizable group in formulae (1) to (4) include an alkyl group, an alkoxy group, an aryl group, an aryloxy group, and a combination thereof. The substituent having no polymerizable group is preferably an alkyl group or an alkoxy group, more preferably an alkoxy group. The alkyl group preferably contains 1 to 12 carbon atoms, more preferably 1 to 9 carbon atoms, even more preferably 1 to 6 carbon atoms. Examples of the alkyl group are methyl, ethyl, propyl, butyl, pentyl, and hexyl. The alkyl group may be straight chain or branched but is preferably straight chain. The alkyl group may be substituted with an alkoxy group, an aryl group, an aryloxy group, etc. The aryl group preferably contains 6 to 14 carbon atoms, more preferably 6 to 10 carbon atoms. Examples of the aryl group are phenyl, 1-naphthyl, and 2-naphthyl. The aryl group may be substituted with an alkyl group, alkoxy group, an aryloxy group, etc. The description of the alkyl group and the aryl group given above applies to the alkyl moiety of the alkoxy group and the aryl moiety of the aryloxy group, respectively.

The monomers of formula (1) may be used either individually or in combination of two or more thereof. When two or more monomers of formula (1) are used in combination, two or more monomers among a monofunctional monomer represented by formula (2), a bifunctional monomer represented by formula (3), and a trifunctional monomer represented by formula (4) may be combined.

The polymerizable monomers having a phosphoester group may be synthesized or may be a commercially available compound, such as those available under the tradename KAYAMER from Nippon Kayaku Co., Ltd. and those available under the tradename PHOSMER from Uni-Chemical Co., Ltd.

For the details of the phosphate esters that are preferably used as an organic layer of the sealing film (gas barrier laminate film), reference may be made to JP 2007-290369A, paras. [0020] through [0042].

Use

While applications of the present invention are not particularly limited, it is preferred for the EL device of the invention to be designed to emit white light with considerations to the use as a light source. White light emission is obtained by using (1) a red conversion material as previously stated, (2) a phosphor capable of emitting white light by itself, such as ZnS phosphor obtained by baking copper- and manganese-doped ZnS, followed by slow cooling, or (3) a mixture of phosphors emitting three primary colors or complementary colors (e.g., a combination of blue-green-red, or a combination of blue-green-orange). The methods taught in JP 7-166161A, JP 9-245511A, and JP 2002-62530A are also preferably followed, in which a phosphor emitting short-wavelength light, such as blue light, is combined with a fluorescent pigment or dye capable of converting a part of the emitted light into green or red to thereby produce white light. The color of the emitted light is preferably such that x and y values of the CIE chromaticity coordinates are in the range of from 0.30 to 0.43 and from 0.27 to 0.41, respectively.

The EL device of the invention is particularly effective in applications where a high luminance, e.g., of 600 $cd/m^2$ or more, is required, specifically, where the EL device is driven by applying a voltage of 100 to 500 V between the transparent electrode and the back electrode or driven by an alternating current source at a frequency of 800 Hz to 4000 kHz.

EXAMPLES

The dispersion-type EL device of the invention will now be illustrated with reference to Examples but is not construed as being limited thereto.

Example 1

A first layer (an insulating layer) and a second layer (light emitting layer) shown below were formed in that order on a 70 μm-thick aluminum electrode (back electrode) by applying the respective coating compositions for forming a layer (shown below) having the viscosity controlled with dimethylformamide and drying at 110° C. for 10 hours.

A 75 μm-thick polyethylene terephthalate film, to which indium tin oxide (ITO) is sputtered to make 40 nm-thick transparent electrode, and the light emitting layer as second layer were brought into contact so that the transparent electrode side (conductive plane) faces to the aluminum electrode and press bonded using a heat roller at 190° C. in a nitrogen atmosphere.

The compositions of the first and second layers are in mass per square meter of the EL device fabricated in Example 1. First layer (insulating layer, containing no red conversion material; thickness: 30 μm)

| | |
|---|---|
| Cyanoethyl pullulan | 14.0 g |
| Cyanoethylated polyvinyl alcohol | 10.0 g |
| Barium titanate particles (average sphere equivalent diameter: 0.05 μm) | 100.0 g |

Second layer (light emitting layer; thickness: 55 μm)

| | |
|---|---|
| Cyanoethyl pullulan | 18.0 g |
| Cyanoethylated polyvinyl alcohol | 12.0 g |
| Phosphor particles (described below) | 120.0 g |

Preparation method of phosphor particles A to F and their properties are described below.

To the powder prepared by dispersing 25 g of zinc sulfide (ZnS) powder having an average particle size of 20 nm and 0.09 mol %, relative to ZnS, of copper sulfate in water and stirring and mixing the dispersion, 4.3 g of NaCl powder, 7.2 g of $MgCl_2$ powder, and 21.3 g of $SrCl_2$ powder all as a flux were added. The mixture was put in an alumina crucible and baked at 1200° C. for 3 hours. After cooling, the powder was ground in a ball mill and blended with 5 g of $ZnCl_2$. The blend was again baked in an aluminum crucible at 700° C. for 6 hours. During the baking, 10% hydrogen sulfide gas was introduced into the furnace. The baked particles were again ground, washed with 40° C. water (dispersed in water, settled out, and freed of the supernatant liquor), cleaned with a 10% hydrochloric acid aqueous solution (dispersed, settled out, and freed of the supernatant liquor) to remove unnecessary salts, and dried. The particles were further cleaned with a 10% KCN aqueous solution heated at 70° C. to remove Cu ions, etc. from the surface. The particles were treated with a 6 mol/L hydrochloric acid aqueous solution to etch the surface layer corresponding to 10 mass % of the total particles. The resulting particles were sieved to obtain phosphor particles A.

Phosphor particles B to F were obtained by appropriately adjusting the amounts of the fluxes, the baking temperatures, and the sieving condition.

The particles A to F were analyzed using a laser diffraction/scattering particle size analyzer LA-920 from Horiba, Ltd. to determine D10 and D90. The results are shown in Table 1.

TABLE 1

| Phosphor Particles | Particle Size (μm) at 10% and 90% of Cumulative Particle Size Distribution | | |
|---|---|---|---|
| | D10 | D90 | D90/D10 |
| A | 14 | 28 | 2.0 |
| B | 11 | 25 | 2.3 |
| C | 12 | 30 | 2.5 |
| D | 9 | 21 | 2.3 |
| E | 10 | 33 | 3.0 |
| F | 8 | 34 | 4.3 |

Coating solutions of light emitting layer were obtained by mixing the respective phosphor particles and the coating composition for forming a light emitting layer. Thus obtained coating solutions were applied to form coatings. Further a film with transparent electrode was press bonded to each of the coatings. An electrode terminal (a 60 μm-thick aluminum sheet) was attached to each of the aluminum electrode and the transparent electrode. The structure was sealed in between sheets of a moisture-proof sealing film (GX film from Toppan Printing Co., Ltd.), which were heat bonded together while evacuating. The resulting EL device using phosphor particles A, B, C, D, E or F was designated EL device 101 through 106, respectively.

Each of the EL devices 101 to 106 was driven by applying a voltage of 150 V using an alternating current source having a frequency of 1000 Hz. The relative luminance, designated "initial luminance", is shown in Table 2, taking the luminance of EL device 101 as 100.

Each of the EL devices was driven continuously for 300 hours at a voltage controlled so as to give the same luminance as EL device 101. The relative luminance measured thereafter is also shown in Table 2, which is a measure of device lifetime, as expressed taking the initial luminance of EL device 101 as 100.

TABLE 2

| EL Device Designation | Phosphor Particles | Relative Initial Luminance | Relative Luminance after 300 hr Drive | Remark |
|---|---|---|---|---|
| 101 | A | 100 | 72 | invention |
| 102 | B | 101 | 70 | invention |
| 103 | C | 80 | 58 | comparison |
| 104 | D | 72 | 60 | comparison |
| 105 | E | 70 | 55 | comparison |
| 106 | F | 70 | 50 | comparison |

It is seen from Table 2 that EL devices 101 and 102 have a relatively high initial luminance and a relatively long lifetime. EL devices 103 to 106 are all inferior to EL devices 101 and 102 for the following reasons. EL device 103 suffers from non-uniformity of electric field due to poor surface smoothness of the light emitting layer because phosphor particles C used in the light emitting layer has a D90/D10 value as high as 2.5. EL device 105 and EL device 106 are out of all the ranges specified in the invention for D10, D90, and D90/D10 and are therefore inferior to EL devices 101 and 102 in initial luminance and lifetime. EL device 104 has D90 and D90/D10 within the ranges of the invention but is out of the scope of the invention in D10 and therefore inferior to EL devices 101 and 102 while better than EL devices 105 and 106 in initial luminance and lifetime.

Example 2

Phosphor particles designated G to J were prepared in the same manner as for phosphor particles A, except for adjusting the amount of copper sulfate so that the resulting phosphor particles might have the Cu content shown in Table 3 below. The Cu content was determined by dissolving the particles in aqua regalis and analyzing the solution by ICP emission spectroscopy. The Cu contents in Table 3 are given in mole percent relative to Zn.

TABLE 3

| Phosphor Particles Designation | Cu Content (mol %) | Particle Size (μm) at 10% and 90% of Cumulative Particle Size Distribution | | |
|---|---|---|---|---|
| | | D10 | D90 | D90/D10 |
| A | 0.09 | 14 | 28 | 2.0 |
| G | 0.11 | 14 | 29 | 2.1 |
| H | 0.13 | 14 | 31 | 2.2 |
| I | 0.16 | 15 | 30 | 2.0 |
| J | 0.17 | 15 | 30 | 2.0 |

EL devices designated 107 through 110 were fabricated in the same manner as in Example 1 and evaluated in initial luminance and lifetime. The results obtained are shown in Table 4.

TABLE 4

| EL Device Designation | Phosphor Particles | Relative Initial Luminance | Relative Luminance after 300 hr Drive | Remark |
|---|---|---|---|---|
| 101 | A | 100 | 72 | invention |
| 107 | G | 104 | 80 | invention |
| 108 | H | 110 | 83 | invention |
| 109 | I | 114 | 90 | invention |
| 110 | J | 90 | 69 | invention |

EL devices 107 to 109 exhibit improvements in initial luminance and lifetime over EL device 101. EL device 110 is slightly inferior to device 101 in initial luminance and lifetime probably because of the large amount of Cu added. It is believed that the phosphor particles J have their surface colored with unremoved excess copper, which causes EL device 110 to have a reduced initial luminance and need a higher voltage to provide equal brightness. It follows that the device lifetime is slightly reduced.

Example 3

An EL device was fabricated in the same manner as for EL device 108 of Example 2, except for incorporating into the insulating layer 3.0 g/m² of a red light-emitting fluorescent dye SEL 1003 from Shinloihi Co., Ltd. The resulting EL device emitted white light with a color rendering index Ra of 86, equal or superior to the light of common fluorescent lamps.

Example 4

An EL device was fabricated in the same manner as for EL device 108, except for replacing 40 mass % of the phosphor particles H with a red fluorescent dye (ZnS:Cu,In). The resulting EL device emitted white light with a color rendering index Ra of 84, equal to the light of common fluorescent lamps.

Example 5

An EL device, designated 201, was fabricated in the same manner as for EL device 101, except for sealed by heat pressing with a polyethylene naphthalate film Teonex Q65FA from Teijin Du Pont Films Japan, Ltd. in place of GX film after press bonding a film with transparent electrode and attaching an electrode terminal (a 60 μm-thick aluminum sheet) to each of the aluminum electrode and the transparent electrode.

One gram each of compound A shown below (KAYAMER PM-21 from Nippon Kayaku), compound B shown below (Light Ester P-2M from Kyoeisha Chemical), or compound C shown below (V#3PA from Osaka Organic Chemical Industry), compounds A to C being as an acrylate having a phosphoester group; compound D shown below (TOPOLEN from Shin-Nakamura Chemical) as an acrylate having a hydroxyl group; compound E shown below (M5300 from Toagosei) as an acrylate having a carboxyl group; or compound F shown below (AAEMA from Aldrich) as an acrylate having an acetylacetone structure, and 9 g of compound G shown below (Light Acrylate TMP-A from Kyoeisha Chemical) which is trifunctional acrylate as a polymerizable acrylate were mixed. The mixture was dissolved in 190 g of methyl ethyl ketone together with 0.6 g of a photopolymerization initiator (IRGACURE 907 from Ciba Geigy) to prepare a coating composition.

The composition was applied to the smooth side of the base film as used above (Teonex Q65FA) using a #6 wire bar and irradiated with UV light at an illuminance of 350 mW/cm² to give a total energy of 500 mJ/cm² using a 160 W/cm air-cooled metal halide lamp (from Eye Graphics) in an environment purged with nitrogen having an oxygen concentration of not more than 0.1% to form an organic layer with a thickness of about 500 nm.

An inorganic layer of aluminum oxide ($AlO_x$) was formed to a thickness of 50 nm on the organic layer by using a sputtering device with Al as a target, argon as a discharge gas, and oxygen as a reactive gas, thereby forming a laminate film.

The same coating composition as used above to form the organic layer was applied to the inorganic layer with a #6 wire bar and irradiated with UV light at an illuminance of 350 mW/cm² to give a total energy of 500 mJ/cm² using a 160 W/cm air-cooled metal halide lamp (from Eye Graphics) in an environment purged with nitrogen having an oxygen concentration of not more than 0.1% to form an organic layer with a thickness of about 500 nm. There was thus obtained a laminate film having a structure of organic layer/inorganic layer/organic layer on the base film. The resulting laminate films using compound A, B, C, D, E, or F in the organic layer were designated laminate film 201A, 201B, 201C, 201D, 201E, or 201F, respectively.

Compound A:

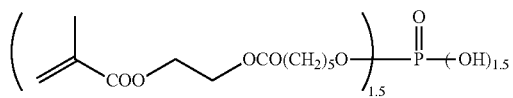

Compound B:

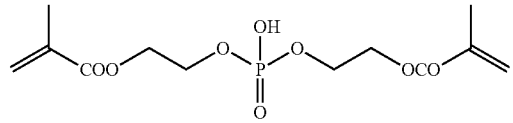

Compound C:

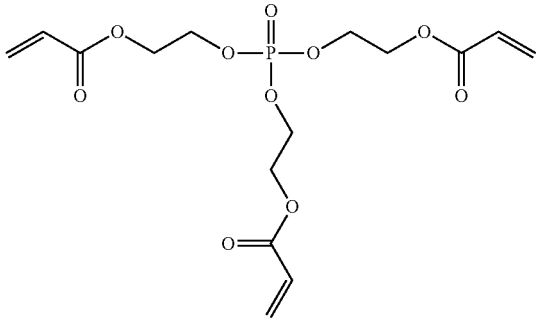

Photopolymerizable compound:

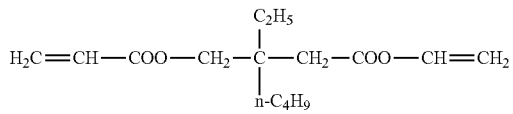

Compound D:

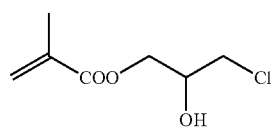

-continued

Compound E:
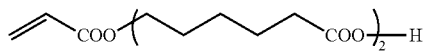

Compound F:
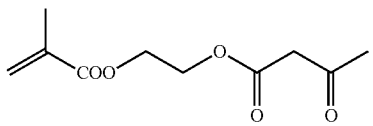

Compound G:
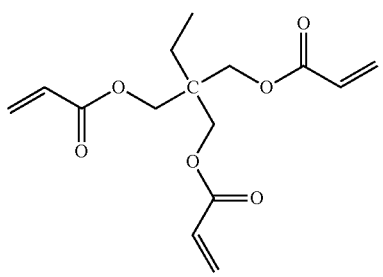

EL devices designated 201A to 201F were fabricated in the same manner as for EL device 201, except for using laminate films 201A to 201F, respectively, as a sealing film. Each of EL devices 201 and 201A to 201F was continuously operated for more than 2000 hours in an environment of 45° C. and 85% RH. The luminance of the device was measured at the beginning (at 0 hr) and after 2000 hours. The results obtained are shown in Table 5, taking the luminance at 0 hr of EL device 201 as 100. The results in Table 5 prove that all of EL devices 201A to 201F undergo little reduction in luminance as compared with EL device 201. More specifically, while not shown in Table 5, EL devices 201A to 201F showed little reduction in luminance after continuous operation for 1000 hours, and EL devices 201A, 201B, and 201C showed little reduction in luminance after continuous operation for 1500 hours.

TABLE 5

| Designation of EL Device | Organic Compound of Sealing Film | Relative Luminance after Continuous Operation | | Remark |
|---|---|---|---|---|
| | | 0 hr | 2000 hrs | |
| 201 | none | 100 | 10 | invention |
| 201A | A | 110 | 105 | invention |
| 201B | B | 105 | 100 | invention |
| 201C | C | 105 | 100 | invention |
| 201D | D | 101 | 80 | invention |
| 201E | E | 102 | 80 | invention |
| 201F | F | 103 | 90 | invention |

INDUSTRIAL APPLICABILITY

The dispersion-type EL device of the invention achieves both high brightness and a long lifetime. The dispersion-type EL device of the invention does not suffer from non-uniformity of an electric field (local generation of a high electric field) and thereby achieves improved durability. In obtaining white light emission by a combined use of a red light-emitting material, the EL device of the invention exhibits excellent color reproduction (color rendering properties).

This application is based on Japanese patent application JP 2009-088522, filed on Mar. 31, 2009, the entire content of which is hereby incorporated by reference, the same as if set forth at length.

The invention claimed is:

1. A dispersion-type electroluminescence device, comprising:
    a pair of electrodes including a transparent electrode and a back electrode; and
    at least a light emitting layer provided between the pair of electrodes, the light emitting layer containing phosphor particles,
    wherein the phosphor particles have D10 of more than 10 µm, D90 of less than 32 µm, and a D90/D10 value of less than 2.40, where D10 and D90 are particle diameters at 10% and 90% values in cumulative distribution of particle size distribution.

2. The dispersion-type electroluminescence device according to claim 1,
    wherein the phosphor particles contain zinc sulfide as a host material; and copper as an activator contained in a concentration of 0.10 to 0.16 mol % with respect to zinc.

3. The dispersion-type electroluminescence device according to claim 1, further comprising:
    a red conversion material.

4. The dispersion-type electroluminescence device according to claim 1,
    wherein the light emitting layer contains red light-emitting phosphor particles besides the phosphor particles.

5. The dispersion-type electroluminescence device according to claim 1, which is sealed by a gas barrier laminate film,
    wherein the gas barrier laminate film includes at least one inorganic layer and at least one organic layer on or above a base film, the organic layer containing a polymerization product of a monomer composition, the monomer composition containing at least one acrylate having a phosphoester group.

* * * * *